United States Patent [19]

Iwasa et al.

[11] Patent Number: 5,250,241
[45] Date of Patent: Oct. 5, 1993

[54] METHOD FOR FORMING MOLDED PORTION AT END OF EXTRUDED WEATHER STRIP

[75] Inventors: Tadanobu Iwasa; Tatsuhiko Nagata; Toshiki Iwata; Hiroyasu Kozawa, all of Inazawa, Japan

[73] Assignee: Toyoda Gosei Co., Ltd., Nishikasugai, Japan

[21] Appl. No.: 779,264

[22] Filed: Oct. 18, 1991

[51] Int. Cl.$^5$ .............................. B29C 67/22
[52] U.S. Cl. .................. 264/46.4; 264/252; 264/276; 264/328.7; 264/328.9
[58] Field of Search .............. 264/276, 252, 328.7, 264/46.4, 328.9

[56] References Cited

U.S. PATENT DOCUMENTS

| | | | |
|---|---|---|---|
| 3,183,285 | 5/1965 | Boylan | 264/276 |
| 3,807,146 | 4/1974 | Witkowski | 264/252 |
| 3,872,198 | 3/1975 | Britton | 264/252 |
| 4,584,155 | 4/1986 | Zanella | 264/252 |
| 4,769,947 | 9/1988 | Ogawa et al. | 49/479 |
| 4,834,931 | 5/1989 | Weaver | 264/261 |
| 4,861,540 | 8/1989 | Nieboer et al. | 264/276 |
| 4,884,370 | 12/1989 | Nozaki et al. | 49/479 |
| 4,908,989 | 3/1990 | Omura et al. | 49/441 |
| 4,910,919 | 3/1990 | Kisanuki et al. | 49/479 |
| 4,957,672 | 9/1990 | Carter et al. | 264/275 |
| 4,986,947 | 1/1991 | Shigeki et al. | 264/262 |
| 5,008,064 | 4/1991 | Sorenson | 264/328.9 |
| 5,108,687 | 4/1992 | Jourquin et al. | 264/276 |

FOREIGN PATENT DOCUMENTS

WO8911959  12/1989  World Int. Prop. O. ........ 264/328.9

*Primary Examiner*—Allan R. Kuhns
*Attorney, Agent, or Firm*—Cushman, Darby & Cushman

[57] ABSTRACT

A method and a device for forming a molded portion at an end of an extruded weather strip. The method includes the steps of placing the end of the extruded weather strip made of foamed elastic material in a cavity defined by a movable upper mold member and a fixed lower mold member which composes a mold, closing the mold with the end of the extruded weather strip clamped by a predetermined clamping force, injecting a foamable molding material into the cavity, moving the upper mold member up by an force not more than the clamping amount in the process of foaming of the foamable molding material to reduce clamping of the upper mold member and to enlarge the cavity, continuing molding with the upper mold member moved up until the foamable molding material fills the enlarged cavity, and opening the mold when molding of the molded portion is completed. The device has a fixed lower mold member, a movable upper mold member, a servomotor, and power transmission means for connecting the servomotor to the upper mold member and converting a rotary movement of the servomotor to a vertical movement of the upper mold member, whereby the upper mold member is moved up and down by a predetermined amount and in a predetermined timing.

2 Claims, 4 Drawing Sheets

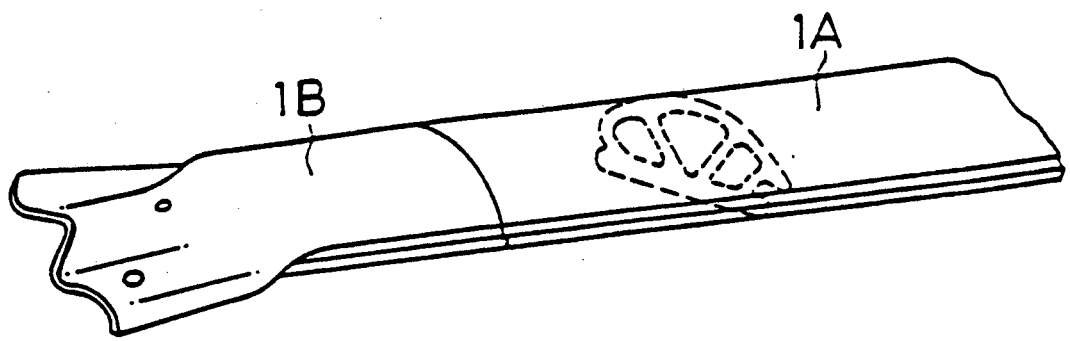
FIG. 1
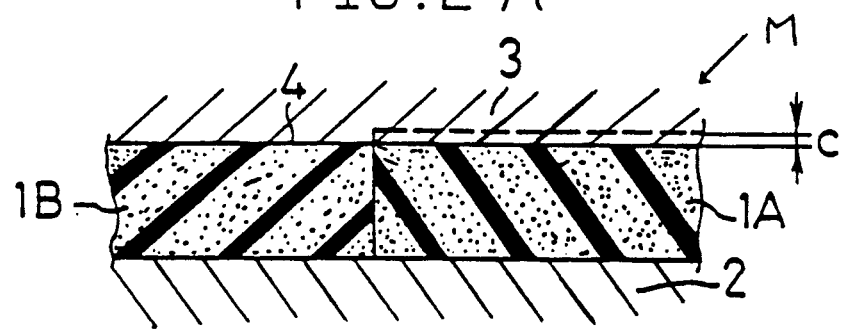
FIG. 2 A
FIG. 2 B
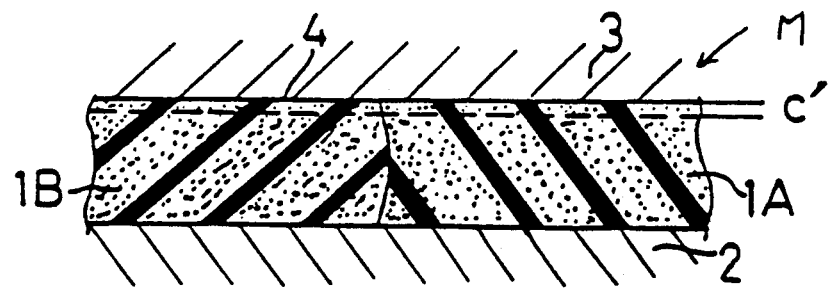
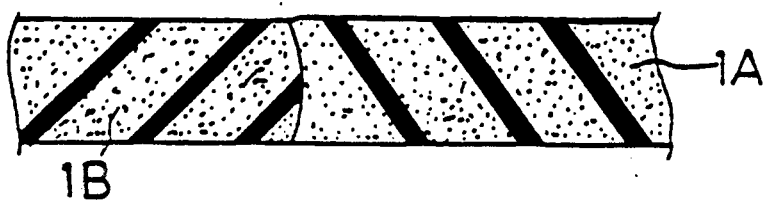
FIG. 3

METHOD FOR FORMING MOLDED PORTION AT END OF EXTRUDED WEATHER STRIP

BACKGROUND OF THE INVENTION

1. Field of the Invention

The present invention relates to a method and a device for forming a molded portion at an end of an extruded weather strip.

2. Description of the Prior Art

A weather strip for attachment around a body opening or a door of a motor vehicle is generally made of an elastic material, particularly rubber or synthetic resin, and is generally formed by extrusion.

In order to shape an end of the extruded weather strip to a desired configuration, an end portion has been connected thereto by molding. And also, ends of two extruded weather strips have been connected by molding (see, for example, U.S. Pat. No. 4,884,370).

The above-described molding has been performed by closing a mold composed of a plurality of mold members with an end of an extruded weather strip placed in a cavity defined by the mold members, and injecting a molding material into the cavity.

Upon closing of the mold, the end of the extruded weather strip is forcibly compressed by the mold members in order to prevent the molding material from leaking out of the cavity, and in order to prevent the end surface of the extruded weather strip from being deformed due to the injection pressure of the molding material. Accordingly, when the mold is opened after molding, the end of the extruded weather strip expands and returns to its original uncompressed shape. This causes the generation of a step between adjacent surfaces of the extruded weather strip and the molded portion.

FIGS. 7 and 8 illustrate the state where the above-described step is generated upon closing of a mold M.

In the drawings, an end of an extruded weather strip is placed between a fixed mold member 2 and a movable mold member 3, and clamped by a clamping amount C.

A molding material is injected into a cavity 4 defined by the fixed mold member 2 and the movable mold member 3 to form a molded portion 1B. When the mold M is opened after molding, the end of the extruded weather strip 1A expands by the amount substantially equal to the clamping amount C. As a result, a step S is generated between the extruded weather strip 1A and the molded portion 1B. This step S is particularly large in the case where the extruded weather strip 1A is made of a foamed material.

Recently, the appearance of various parts of a motor vehicle has been improved. And the appearance of the molded portion of the weather strip has been also required to be improved.

However, the above-described step causes the deterioration of the appearance of the molded portion. Also, this step causes the decrease in sealing performance of the resulting weather strip.

SUMMARY OF THE INVENTION

It is an object of the present invention to provide a method for forming a molded portion at an end of an extruded weather strip by which the generation of a step between adjacent surfaces of the extruded weather strip and the molded portion can be prevented or can be reduced to a negligibly small scale, and to provide a device for carrying out the above-described method.

The method in accordance with the present invention comprises the steps of closing a mold composed of a plurality of mold members with an end of a weather strip which is formed by extruding foamed elastic material clamped between a fixed mold member and a movable mold member by such a clamping force as to prevent a molding material from leaking out of the mold, injecting a foamable molding material into a cavity of the mold, moving the movable mold member by an amount not more than the clamping force to reduce clamping of the movable mold member and to enlarge the cavity when the foamable molding material fills the cavity in the process of foaming and expanding of the foamable molding material in the cavity, continuing molding with the movable mold member moved until the foamable molding material further foams and fills the enlarged cavity, and opening the mold when molding is completed.

The device in accordance with the present invention has a fixed mold member, a movable mold member which is opposed to the fixed mold member and defines a cavity with the fixed mold member, drive means for driving the movable mold member, and power transmission means for connecting the drive means to the movable mold member, and converting the movement of the drive means to the movement of the movable mold member.

Due to a predetermined operation of the drive means in one direction, the movable mold member is moved to its closed position to clamp the end of the extruded weather strip with the fixed mold member by a predetermined clamping force.

Due to a following predetermined operation of the drive means in the opposite direction at the time the foamable molding material foams to fill the cavity, the movable mold member is moved by the amount not more than the clamping force to reduce clamping of the movable mold member and enlarge the cavity.

When the foamable molding material further foams and fills the enlarged cavity and molding is completed, the drive means is further operated, whereby the movable mold member is moved to its fully open position.

In accordance with the principles of the present invention, the movable mold member is moved by the amount not more than the clamping amount in the process of foaming of the foamable molding material so that the end of the extruded weather strip is brought into a substantially free condition. Therefore, the surface of the resulting molded portion becomes substantially flush with the surface of the extruded weather strip in the free condition. Accordingly, a step formed between adjacent surfaces of the extruded weather strip and the molded portion of the resulting product is negligible.

In order to carry out the method of the present invention, high accuracy is required for the timing operation and the force operation of the movable mold member. Accordingly, it is preferable to employ a servomotor as the drive means of the present invention. However, conventional hydraulic means may be employed as the drive means of the present invention.

When the servomotor is employed as the drive means for the movable mold member, the movable mold member can move with high accuracy with a predetermined timing operation and force. This enables fine adjustment of the operation parameters of the movable mold member.

BRIEF DESCRIPTION OF THE DRAWING

Other objects, features and characteristics of the present invention will become apparent upon consideration of the following description and the appended claims with reference to the accompanying drawings, all of which form a part of this specification.

FIG. 1 is a view illustrating an end portion of a weather strip to which a method in accordance with the principles of the present invention is applied;

FIGS. 2A and 2B illustrate the processs of the method of the present invention;

FIG. 2A is a longitudinal sectional view of a molded portion in the state where a mold is closed with the end portion of an extruded weather strip clamped, and a molding material is injected into the mold;

FIG. 2B is a longitudinal sectional view of the molded portion in the state where a movable upper mold member is slightly moved in the process of molding;

FIG. 3 is a longitudinal sectional view of a resulting weather strip which is taken out of the mold;

DETAILED DESCRIPTION OF THE PRESENTLY PREFERRED EXEMPLARY EMBODIMENTS

FIG. 1 illustrates an end portion of a weather strip to which the present invention is applied. A weather strip 1A is a roof weather strip which is attached to a door opening of a motor vehicle to seal a periphery of a door glass when the door opening is closed by a sashless door. The weather strip 1A is formed by extruding foamed rubber, and an end portion 1B made of foamed rubber like that of the weather strip 1A is connected to an end of the weather strip 1A by molding.

FIGS. 2A and 2B illustrate the process of the method of the present invention.

The molded end portion 1B is formed by means of a mold M composed of a lower mold member 2 as a fixed mold member and an upper mold member 3 as a movable mold member.

An end of the weather strip 1A is placed in the cavity defined by the lower mold member 2 and the upper mold member 3, and the mold M is closed with the end of the weather strip 1A clamped. Then, a foamable rubber material is injected into the cavity through a gate.

Figure 7:
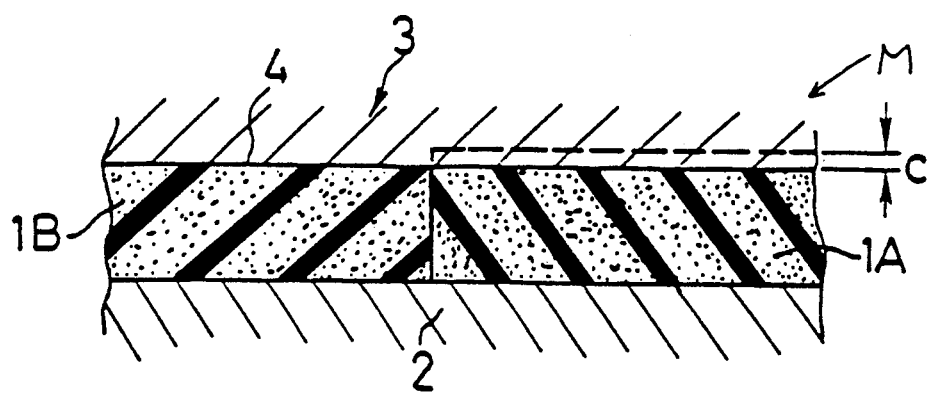
FIG. 7 is a longitudinal sectional view of a molded portion which is molded by a conventional method.
Figure 8:
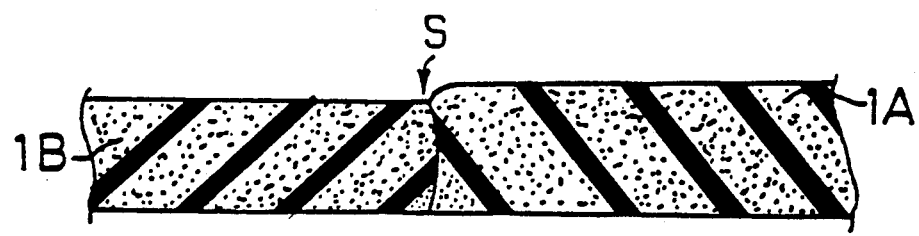
FIG. 8 is a longitudinal sectional view of a resulting conventional weather strip which is taken out of the mold.

FIG. 2A is a view explaining the state where the foamable rubber material is injected into the cavity of the mold M. In the drawing, the upper mold member 3 clamps the end of the weather strip 1A with the lower mold member 2 by the clamping amount C. This process is identical to that of the conventional method, which is shown in FIG. 7.

The foamable rubber material is injected by the amount slightly less than the volume of the cavity in anticipation of the expansion of the foamable rubber material due to foaming.

At the time the foamable rubber material foams to substantially fill the cavity, the upper mold member 3 is moved up by the amount C' (C'≦C) to enlarge the cavity, as shown in FIG. 2B. The upper mold member 3 is kept in place until the foaming of the foamable rubber material proceeds to fill the enlarged cavity defined by the upper mold member which is moved up, and molding is completed. In this step, the foamable rubber material does not leak through the spaces between the upper and lower mold members and the end of the extruded weather strip which is free from the clamping by the upper mold member because, due to foaming, the foamable rubber material loses fluidity which allows the foamed rubber material to intrude into the spaces.

Then, the upper mold member 3 is further moved up to open the mold M, and the molded portion is taken out of the mold M.

FIG. 3 is a view showing the resulting weather strip formed by the method of the present invention. A step between adjacent surfaces of the weather strip 1A and the molded portion 1B is negligible.

Figure 4:
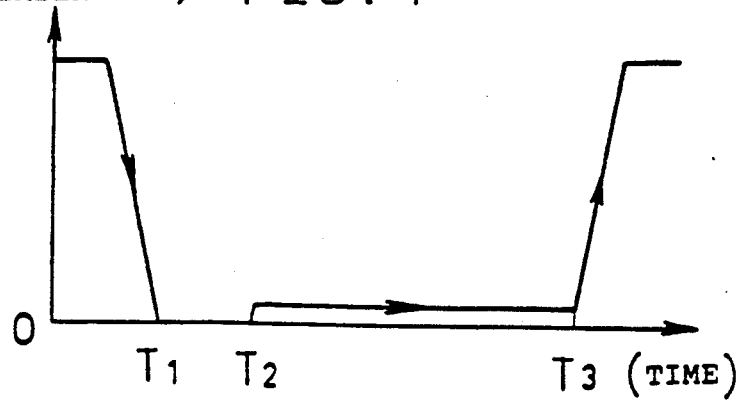
FIG. 4 is a graph showing the change of position of the movable upper mold member with time.

FIG. 4 shows the change of position of the upper mold member with time. In FIG. 4, T1 designates the time the mold is completely closed with the end of the extruded weather strip clamped, T2 designates the time the upper mold member begins to moved up in the process of molding, and T3 designates the time the mold starts to be open.

Upon testing by the inventors, it has been confirmed that the above-described step between the adjacent surfaces of the extruded weather strip 1A and the molded portion 1B must be decreased to about 0.05 mm or less in order to make such a step inconspicuous in both appearance and touch. To this end, the clamping amount must be decreased to 0.1 mm or less. However, this small clamping amount would cause the molding material to leak from the cavity through the spaces between the mold members and the extruded weather strip, and also cause the end surface of the extruded weather strip to be undesirably deformed due to the pressure of the molding material.

In accordance with the principles of the present invention, by moving the upper mold member up by the amount C' (C−C'≦0.1 mm) in the process of foaming, the resulting step between the surfaces of the extruded weather strip and the molded portion can be reduced to 0.05 mm or less without any leakage of the molding material and undesirable deformation of the extruded weather strip.

Figure 5:
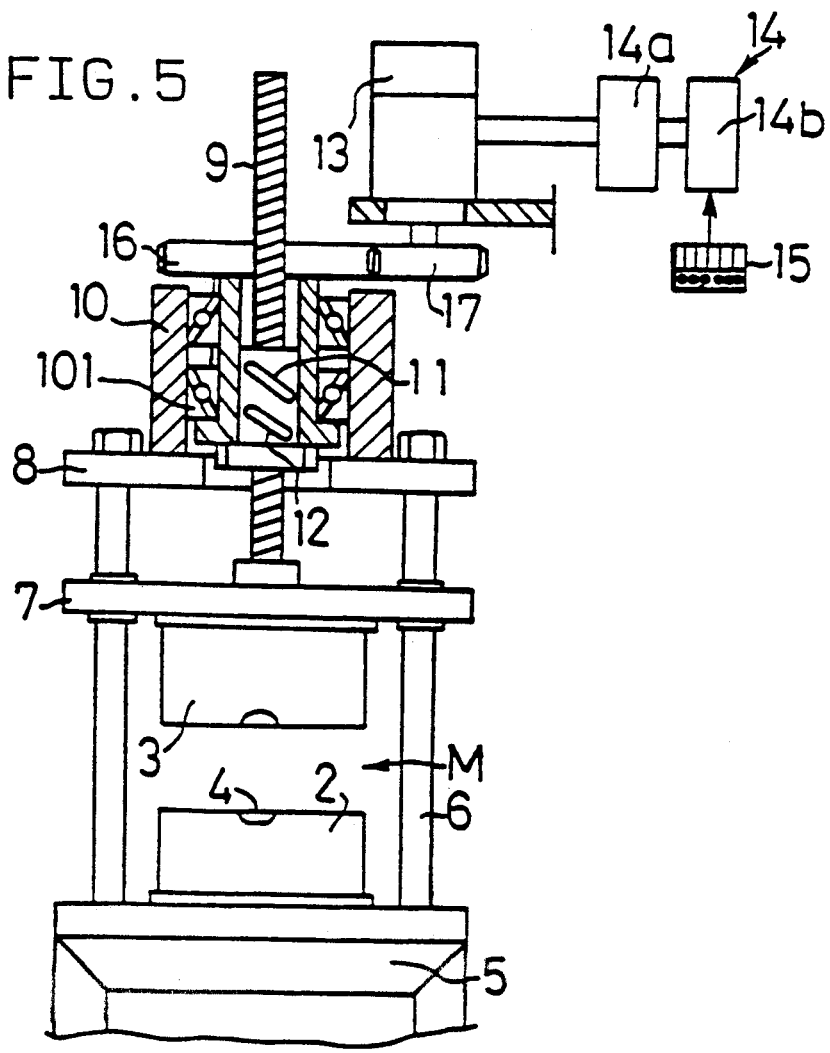
FIG. 5 is an overall view of a device in accordance with the principles of the present invention.

FIG. 5 is a view illustrating the device which carries out the method of the present invention.

The lower mold member 2 of the mold M is mounted on a base 5. Tie bars 6 vertically stand on the base 5 and slidably retain a support member 7 which supports the upper mold member 3. The lower mold member 2 and the upper mold member 3 define the cavity 4 of the mold M.

A holder 8 is fixed to the ends of the tie bars 6. A cylindrical bearing housing 10 stands on the holder 8. Within the housing 10, bearings 101 are disposed on the upper side and the lower side thereof. A cylindrical nut housing 11 is rotatably disposed within the bearings 101, and a nut 12 is fixed within the nut housing 11 so as to rotate integrally with the nut housing 11. A ball screw 9 is inserted into the nut 12 so as to engage therewith. A lower end of the ball screw 9 is fixed to the support member 7.

A gear 16 having an opening through which the ball screw 9 is inserted is fixed to an upper end of the nut housing 11.

A rotary shaft of a servomotor 13 which serves as the drive means, supports a gear 17 which engages with the gear 16.

The servomotor 13 is a DC motor which is electrically connected to and driven by the servocontroller 14. The servocontroller 14 is composed of a drive amplifier circuit 14a and a control circuit 14b. The control circuit 14b has a built-in micro computer, and is electrically connected to an external setter 15. The control circuit 14b controls the rotating direction and the rotational amount of the servomotor 13 in accordance with the operation program of the upper mold member 3, which is set by the external setter 15.

Upon the operation of the control circuit 14b, command signals determined in the respective operation steps are output to a drive amplifier circuit 14a, and the rotating amount of the servomotor 13 is fed back in the form of pulse signals to the drive amplifier circuit 14a by means of a pulse generator provided in the servomotor 13.

Due to the rotation of the servomotor 13, the nut 12 rotates integrally with the nut housing 11 through the gears 16 and 17. Due to the rotation of the nut 12, the ball screw 9 rotates and moves up and down. As a result, the upper mold member 3 moves verticaly together with the support member 7.

By vertically moving the upper mold member 3 as shown in FIG. 5, the method for forming a molded portion at an end of the extruded weather strip is carried out.

The device of the present embodiment enables the upper mold member to move vertically, particularly to move upwardly in the process of foaming, by a finely adjusted amount with very accurate timing.

Figure 6:
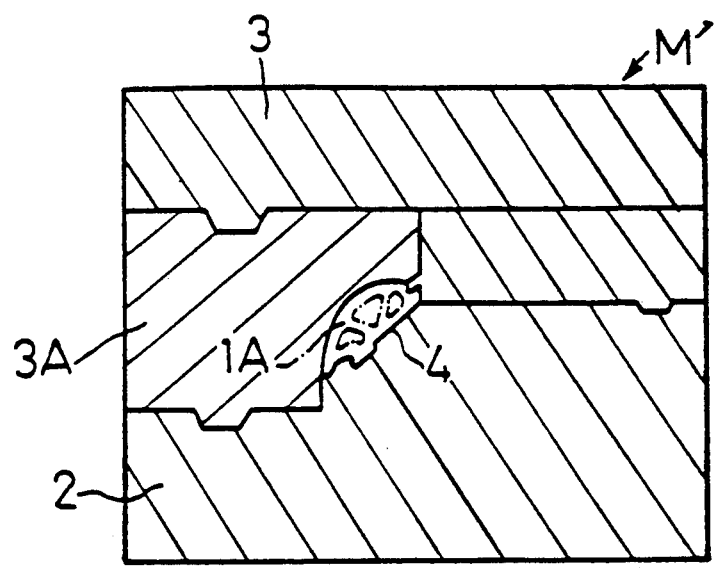
FIG. 6 is a cross-sectional view of one example of a mold which is employed in the device in accordance with the principles of the present invention.

The device of the above-described embodiment employs the mold of which the upper mold member directly clamps the end of the extruded weather strip. The present invention is also applicable to the mold M' which is composed of a fixed lower mold member 2, a middle mold member 3A and a movable upper mold member 3, as shown in FIG. 6. In this mold M', a cavity 4 is defined by the fixed lower mold member 2 and the middle mold member 3A, and the movable upper mold member 3 clamps the end of the extruded weather strip 1A through the middle mold member 3A.

In this case, in the process of foaming of the molding material, the upper mold member 3 is moved up by the amount not more than the clamping amount. As a result, the middle mold member 3A moves up due to both the returning of the size and shape of the end of the extruded weather strip and the foaming of the injected molding material. Accordingly, the present embodiment also achieves operational effect substantially identical to that of the preceding embodiment.

In the preceding embodiments, the upper mold member serves as the movable mold member while the lower mold member serves as the fixed mold member. Instead, in accordance with the principles of the present invention, the upper mold member may serve as the fixed mold member while the lower mold member may serve as the movable mold member. In this case, the drive means drives the movable lower mold member by way of the power transmission means.

The method and the device of the present invention are applicable not only to the formation of the molded end portion of the extruded weather strip, but also to the connection of two extruded weather strips. In the latter case, two extruded weather strips can be connected by molding without any step between adjacent surfaces of the extruded weather strip and the molded connecting portion.

What is claimed is:

1. A method for forming a molded portion at an end of an extruded weather strip, comprising the steps of:
    placing the end of the extruded weather strip, formed by extruding foamed elastic material, in a cavity defined by a movable mold member and a fixed mold member, the movable mold member and the fixed mold member composing a mold;
    closing said mold with the end of the extruded weather strip clamped by a predetermined clamping force so as to compress the weather strip;
    injecting a foamable molding material into said cavity to begin a molding process;
    moving said movable mold member by an amount not more than a displacement caused by said clamping force during foaming of said foamable molding material to reduce clamping and thus compression of said movable mold member and to enlarge said cavity, thereby substantially preventing generation of a step between adjacent surfaces of the extruded weather strip and the molding material;
    continuing said molding process with said movable mold member moved by said amount until said foamable molding material expands and fills said enlarged cavity and curing the formed molding material; and
    opening said mold when molding of said molded portion is completed.

2. The method according to claim 1, wherein said foamed elastic material is selected from the group consisting of rubber and synthetic resin.

* * * * *